United States Patent [19]

Petschke et al.

[11] Patent Number: 5,774,948
[45] Date of Patent: Jul. 7, 1998

[54] TIE-DOWN RING

[75] Inventors: Steven J. Petschke, New Baltimore; James W. Petschke, Chesterfield, both of Mich.

[73] Assignee: Creative Wire & Tube Forming, Inc., Mt. Clemens, Mich.

[21] Appl. No.: 833,133

[22] Filed: Apr. 4, 1997

[51] Int. Cl.$^6$ ............................. A44B 11/00; B61D 45/00
[52] U.S. Cl. ........................... 24/265 CD; 24/265 AL; 24/498; 410/101
[58] Field of Search ...................... 24/265 CD, 265 AL, 24/300, 343, 68 CD, 605, 498, 573.1, 573.5, 599.9; 410/115, 116, 101, 105, 108

[56] References Cited

U.S. PATENT DOCUMENTS

| | | |
|---|---|---|
| D. 311,326 | 10/1990 | Nelson . |
| 2,609,761 | 9/1952 | Clark .................. 24/265 CD |
| 2,953,104 | 9/1960 | Oakley . |
| 3,888,190 | 6/1975 | Bigge . |
| 3,960,091 | 6/1976 | Ehlert . |
| 4,005,904 | 2/1977 | Weman et al. .......... 24/265 AL |
| 4,864,699 | 9/1989 | Whitcomb .............. 24/498 |
| 4,907,921 | 3/1990 | Akright . |
| 5,071,193 | 12/1991 | Childress et al. ........ 24/265 AL |
| 5,180,263 | 1/1993 | Flowers, Jr. ............ 410/101 |
| 5,248,176 | 9/1993 | Fredriksson . |
| 5,553,981 | 9/1996 | Braden ................. 24/343 |

FOREIGN PATENT DOCUMENTS

| | | | |
|---|---|---|---|
| 1433279 | 4/1976 | United Kingdom .......... | 24/265 AL |

*Primary Examiner*—Victor N. Sakran
*Attorney, Agent, or Firm*—Howard & Howard

[57] ABSTRACT

An articulating tie-down anchor (10) for securing cargo straps or roping includes a base plate (16), a top plate (18) and a knuckle (32) interconnecting the base (16) and top (18) plates. A ring (24) has a shank (26) pivotally journaled in the knuckle (32) and a swinging section (28) which is capable of moving in a 180° arc when mounted on a flat support structure (12). The swinging section (28) of the ring (24) surrounds the smaller top plate (18) when in a compact folded storage position and rests on the larger base plate (16). A bolt (36) passes through aligned receiving holes (20, 22) in the top (18) and base (16) plates to attach the assembly (10) to the support structure (12). A resilient tube (34) is disposed within the knuckle (32) and is partially compressed lengthwise against the shank (26) to restrain the ring (24) in any pivotally articulated position relative to the base plate (16). The tube (34) presses into a groove (30) in the shank (26) to restrain lateral movement of the ring (24) relative to the base plate (16).

28 Claims, 2 Drawing Sheets

TIE-DOWN RING

BACKGROUND OF THE INVENTION

1. Field of the Invention

The subject invention relates generally to tie-down anchors of the type for securing cargo straps, and more particularly to a tie-down anchor having an articulating ring.

2. Description of Related Art

A strap with an S-hook end or a roping element is frequently used to lash cargo in place on a trailer or truck bed. It is most expedient to attach the strap or roping to a dedicated tie-down anchor. Ring style tie-down anchors are commonly used in such applications, and frequently include a D-shaped, triangular, or rectangular ring which is pivotally journaled in a base. The base, in turn, is attached to the trailer of truck bed as by a bolt or rivet.

Many such ring style tie-down anchors are freely rotatable relative to the base. These types of tie-downs can be cumbersome to use when the ring needs to be held at a given angle prior to attachment of the strap or roping and a free hand is not available to hold the ring in position. Also, tie-down anchors which are freely rotatable relative to the base can cause annoying rattling and vibrating sounds when the vehicle is moving. Notwithstanding, tie-down anchors which are freely rotatable relative to the base are advantageous in that they can usually fold compactly against the base when not in use.

U.S. Pat. No. 5,248,176 to Fredriksson, issued Sep. 28, 1993, discloses a tie-down anchor that is freely rotatable relative to its base, yet includes various alternative elements for creating friction against the ring so that it will remain in any pivoted position. However, the Fredriksson friction elements are relatively expensive to fabricate and labor intensive to assemble. Also, the Fredriksson friction elements are particularly susceptible to weather and dirt infiltration, which may lead to poor articulating properties over time.

SUMMARY OF THE INVENTION

The subject invention comprises an articulating tie-down anchor of the type having a base plate, a knuckle extending from the base plate, and a ring. The ring has a shank pivotally journaled in the knuckle. The improvement of the invention comprises a resilient tube having a length disposed within the knuckle and compressed lengthwise against the shank to restrain the ring in any pivotally articulated position relative to the base plate.

The subject tube creates friction against the ring so that it will remain in any pivoted position. In contradistinction to the prior art, the tube is very inexpensive to fabricate, very simple to assemble, and provides a durable friction producing wear surface against the shank. Furthermore, the tube can be cut from commercially available tubing products without waste or scrap in the manufacturing process. Also, with no moving parts and made from synthetic materials, the tubing is substantially weather impervious.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
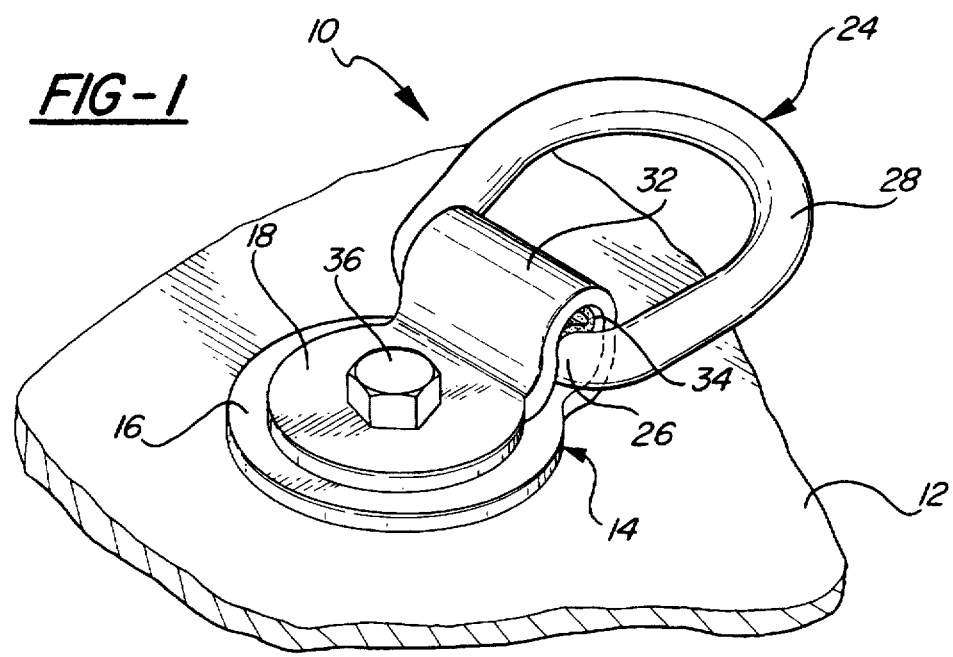
FIG. 1 is a perspective view showing a tie-down anchor according to the subject invention operatively attached to a support structure.

Referring to the Figures, wherein like numerals indicate like or corresponding parts throughout the several views, an articulating tie-down anchor is generally shown at 10. The articulating tie-down anchor 10 is of the type for securing cargo straps or roping (not shown) to a support structure 12, such as the floor of a truck bed or trailer bed. However, those skilled in the art will readily appreciate many additional applications of the subject tie-down anchor 10.

The tie-down anchor 10 includes a body portion, generally indicated at 14, which is preferably composed of a singular length of heavy gauge sheet metal. The body portion 14 is initially formed, such as by a stamping operation, in a shape loosely resembling a figure-8, with a larger and generally circular base plate 16, a smaller and generally circular top plate 18 and an intermediate tab portion joining the base 16 and top 18 plates. During the initial forming process, receiving holes 20, 22 are punched in the respective base 16 and top 18 plates, generally centered within their peripheries.

A ring, generally indicated at 24, is formed in a separate operation into a endless shape having a generally straight cylindrical shank 26 and a swinging portion 28. The swinging section 28 may take the form of the substantially arcuate shape shown in the Figures, wherein the resulting periphery of the ring 24 is generally D-shaped. However, those skilled in the art will readily appreciate other satisfactory peripheral geometric shapes of the ring 24, such as triangular or rectangular. The ring 24 is preferably fabricated from a length of round bar stock suitable for such applications, with its ends butted together and joined as by welding generally midway along the length of the shank 26. A slight gap is intentionally left between the welded or otherwise joined ends to create a narrow groove 30.

Figure 2:
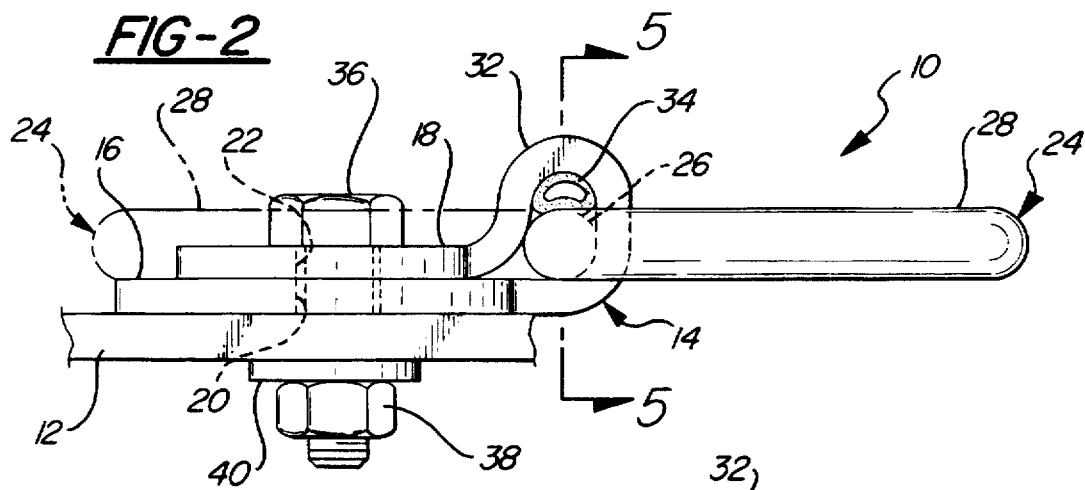
FIG. 2 is a side elevation view of the tie-down anchor showing the ring in solid and phantom between extreme articulated positions.
Figure 3:
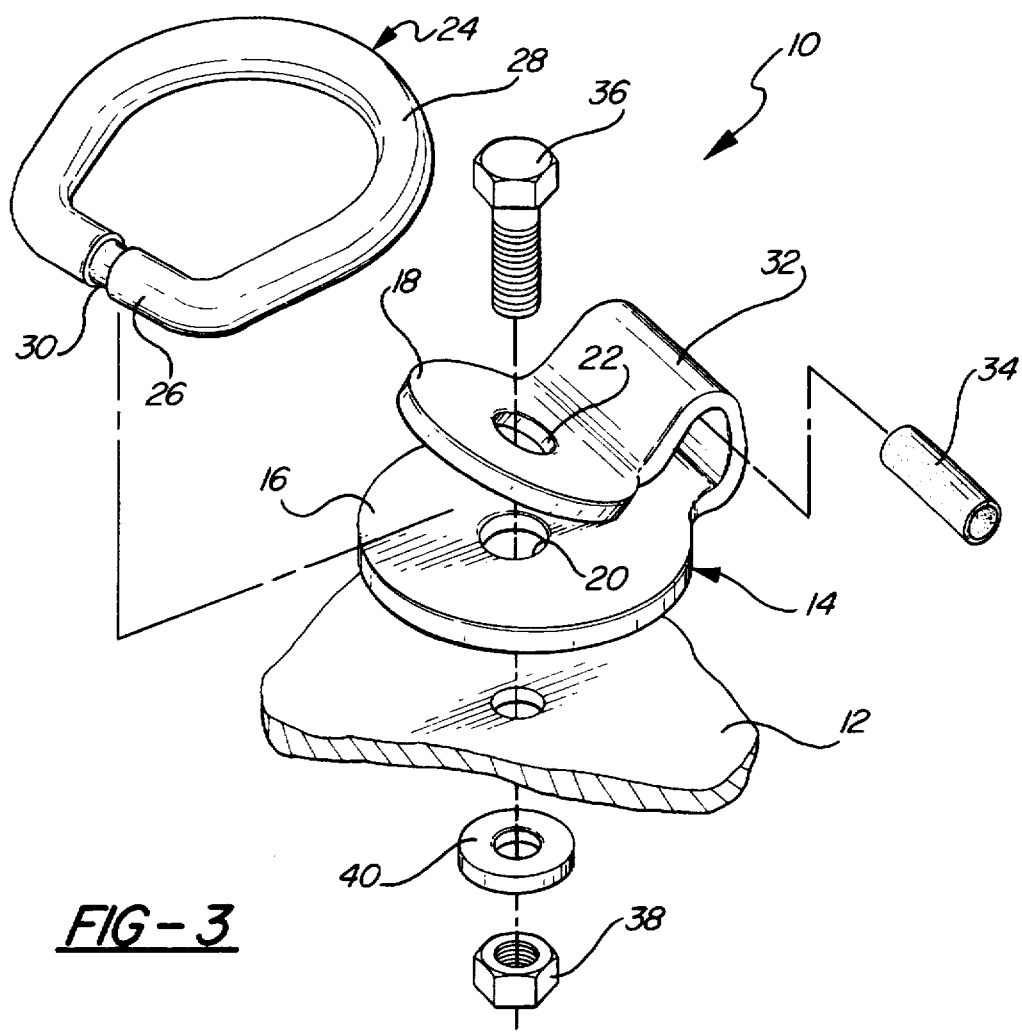
FIG. 3 is an exploded perspective view of the tie-down anchor.

In a subsequent operation, the tab portion is deformed and bent, as shown in FIG. 3, so as to fold the top plate 18 into an overlying position against the base plate 16. The tab portion is thereby transformed into an upstanding knuckle 32. However, before the top plate 18 is brought into full face-to-face contact with the base plate 16, the shank 26 is positioned within the knuckle 32 where it is trapped in an operational position shown in FIG. 1. In other words, the shank 26 is rotatably journaled in the knuckle 32, for movement of the swinging section 28 in generally a 180° range as shown in FIG. 2.

Figure 5:
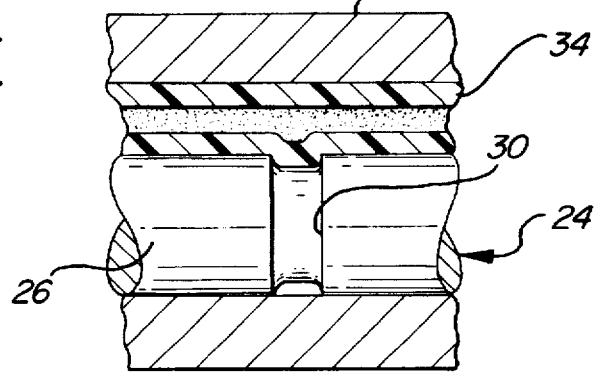
FIG. 5 is a fragmentary cross-sectional view taken along lines 5—5 of FIG. 2.

Concurrently with trapping the shank 26 in the knuckle 32, a short length of resilient pad 34 is also disposed within the knuckle 32 and compressed lengthwise against the shank 26 when the forming operation brings the top plate 18 into full face-to-face contact with the base plate 16. Preferably, the tube 34 is positioned on top of the shank 26, i.e., spaced from the base plate 16 as shown in FIGS. 2 and 5. The concavely compressed tube 34 creates friction between itself and the shank 26, and also between the shank 26 and the base plate 16, which restrains the ring 24 in any angular position to which it is moved.

The pad 34 may be cut from any length of commercially available resilient tubing, but satisfactory results have been obtained using essentially nylon tubing and essentially neoprene tubing. It is preferred that the tubing not be fully compressed, as shown in FIG. 2, where an air gap remains inside the tubing to enhance durability and prevent an over-crush condition. As the ring 24 is manipulated back-and-forth, the resilient tube 34 will migrate or displace into the groove 30 in the shank 26, as shown in FIG. 5. This provides a small but beneficial amount of resistance to lateral motion of the ring 24 relative to the base 14. However, those skilled in the art will appreciate that non-tubing, i.e., hollow, shapes can also be used for the pad.

The periphery of the ring 24 is preferably larger than the top plate 18 and smaller than the base plate 16 so that when the swinging section 28 is folded in the storage position shown in phantom in FIG. 2, the swinging section 28 will rest on and be supported by the base plate 16 while surrounding the top plate 18. In other words, when in the storage position, the top plate 18 nests substantially within the periphery of the ring 24.

Figure 4:
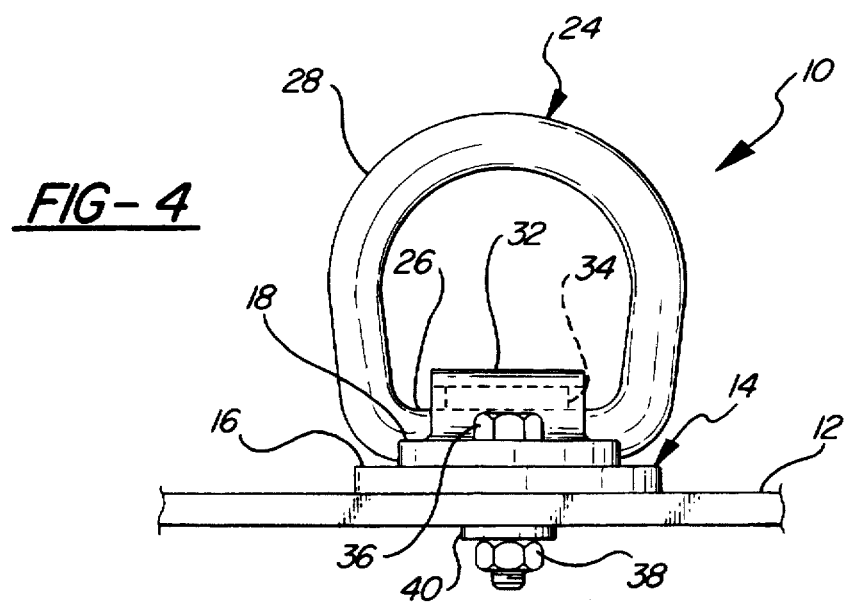
FIG. 4 is front elevation view of the tie-down anchor.

The tie-down anchor assembly 10 may be secured to the support structure 12 by a threaded fastener, such as a bolt 36. The bolt 36 passes through each of the receiving holes 20, 22 which are aligned with one another in the fully formed condition of the base 14 shown in FIGS. 1, 2 and 4. If the bolt 36 is not of the self-tapping kind, a nut 38 and washer 40 may be provided on the underside of the support structure 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An articulating tie-down anchor (10) comprising: a base plate (16); a knuckle (32) extending from said base plate (16); a ring (24) having a shank (26) pivotally journaled in said knuckle (32); and characterized by a resilient tube (34) having a length disposed within said knuckle (32) and compressed lengthwise against said shank (26) with an outer surface of said tube (34) contacting said knuckle (32) and said shank (26) to restrain said ring (24) in any pivotally articulated position relative to said base plate (16).

2. An assembly (10) as set forth in claim 1 wherein said shank (26) is generally linear.

3. An assembly (10) as set forth in claim 2 wherein said shank (26) is generally cylindrical.

4. An assembly (10) as set forth in claim 1 further including a top plate (18) integral with said base plate (16) and said knuckle (32).

5. An assembly (10) as set forth in claim 4 wherein said ring (24) includes an swinging section (28) extending from said shank (26) portion and defining a ring periphery.

6. An assembly (10) as set forth in claim 5 wherein said top plate (18) occupies an area smaller than said ring periphery.

7. An assembly (10) as set forth in claim 4 wherein said shank (26) includes a groove (30) in which a portion of said tube (34) is displaced.

8. An assembly (10) as set forth in claim 4 wherein said top plate (18) includes a receiving hole (22) and said base plate (16) includes a receiving hole (20) aligned with said receiving hole (22) in said top plate (18).

9. An assembly (10) as set forth in claim 8 further including a fastener (36) extending through said receiving holes (20, 22) in said top (18) and base (16) plates.

10. An assembly (10) as set forth in claim 9 wherein said fastener (36) includes screw threads.

11. An assembly (10) as set forth in claim 4 wherein said top plate (18) and said base plate (16) and said knuckle (32) are fabricated from a common length of sheet metal.

12. An assembly (10) as set forth in claim 1 wherein said tube (34) is fabricated from a nylon material.

13. An assembly (10) as set forth in claim 1 wherein said tube (34) is fabricated from a neoprene material.

14. An assembly (10) as set forth in claim 1 wherein said tube (34) is spaced from said base plate (16).

15. An articulating tie-down anchor (10) comprising: a base plate (16); a top plate (18) overlying said base plate (16); a knuckle (32) integrally interconnecting said top (18) and base (16) plates; a ring (24) having a generally straight cylindrical shank (26) pivotally journaled in said knuckle (32); and characterized by a resilient pad (34) having a length disposed within said knuckle (32) and compressed lengthwise against said shank (26).

16. An assembly (10) as set forth in claim 15 wherein said ring (24) includes an swinging section (28) extending from said shank (26) portion and defining a ring periphery.

17. An assembly (10) as set forth in claim 16 wherein said top plate (18) occupies an area smaller than said ring periphery.

18. An assembly (10) as set forth in claim 15 wherein said shank (26) includes a groove (30) in which a portion of said pad (34) is displaced.

19. An assembly (10) as set forth in claim 15 wherein said top plate (18) includes a receiving hole (22) and said base plate (16) includes a receiving hole (20) aligned with said receiving hole (22) in said top plate (18), and a fastener (36) extending through said receiving holes (20, 22) in said top (18) and base (16) plates.

20. An assembly (10) as set forth in claim 15 wherein said pad comprises a tube (34) fabricated from a nylon material.

21. An assembly (10) as set forth in claim 15 wherein said pad comprises a tube (34) fabricated from a neoprene material.

22. An assembly (10) as set forth in claim 15 wherein said pad comprises a tube (34) spaced from said base plate (16).

23. A method for assembling an articulating tie-down anchor (10) comprising the steps of: providing an integral base plate (16) and top plate (18) and intermediate tab between the top (18) and base (16) plates; providing a ring (24) having a shank (26); forming the tab into an upstanding knuckle (32) while folding the top plate (18) toward a position generally overlying the base plate (16); positioning the ring (24) in the knuckle (32); and characterized by compressing a resilient pad (34) within the knuckle (32) against the shank (26) of the ring (24) to restrain the ring (24) in any pivotally articulated position relative to the top (18) and base (16) plates.

24. A method as set forth in claim 23 further including forming a groove (30) in the shank (26).

25. A method as set forth in claim 24 wherein said compressing step includes displacing a portion of the pad (34) into the groove (30).

26. A method as set forth in claim 23 wherein said step of providing an integral base plate (16) and top plate (18) includes forming generally circular peripheries of the top (18) and base (16) plates.

27. A method as set forth in claim 23 further including forming aligned receiving holes (20, 22) in the top (18) and base (16) plates, and positioning a fastener (36) in the aligned receiving holes (20, 22).

28. A method as set forth in claim 23 wherein said compressing step includes spacing the pad (34) away from the base plate (16).

* * * * *